United States Patent [19]

Bottum

[11] Patent Number: 4,867,231
[45] Date of Patent: Sep. 19, 1989

[54] AIR TO AIR HEAT EXCHANGE STRUCTURE AND METHOD

[76] Inventor: Edward W. Bottum, 525 N. Fifth St., Brighton, Mich. 48116

[21] Appl. No.: 117,952

[22] Filed: Nov. 9, 1987

[51] Int. Cl.⁴ .......................... F28D 15/02; F24H 3/02
[52] U.S. Cl. .................................. 165/54; 165/104.21; 165/122; 165/160
[58] Field of Search .................... 165/54, 104.21, 901, 165/909, 160, 122

[56] References Cited

FOREIGN PATENT DOCUMENTS

| 116039 | 9/1980 | Japan | 165/54 |
| 179744 | 10/1983 | Japan | 165/54 |
| 901801 | 1/1982 | U.S.S.R. | 165/104.21 |

*Primary Examiner*—Albert W. Davis, Jr.

[57] ABSTRACT

Air to air heat exchanger structure and method including a helical heat exchange coil having a lower portion and an upper portion, refrigerant in the lower portion of the heat exchange coil, a first chamber surrounding the upper portion of the heat exchange coil, a second chamber surrounding the lower portion of the heat exchange coil, structure connecting the bottoms of the coil portions and the tops of the coil portions to each other, and motor and blower structure for passing warm air over the lower portion of the heat exchange coil to boil the refrigerant therein and for drawing cool air over the upper portion of the heat exchange coil to heat the cool air whereby the boiled refrigerant in the upper portion of the heat exchange coil is condensed and flows by gravity back to the lower portion of the heat exchange coil. The air to air heat exchange structure is adapted for utilization in a window opening to ventilate a dwelling space. Switch means is provided for de-energizing the motor, blower structure when less than a desired amount of air is drawn into the dwelling space through the air to air heat exchanger.

40 Claims, 2 Drawing Sheets

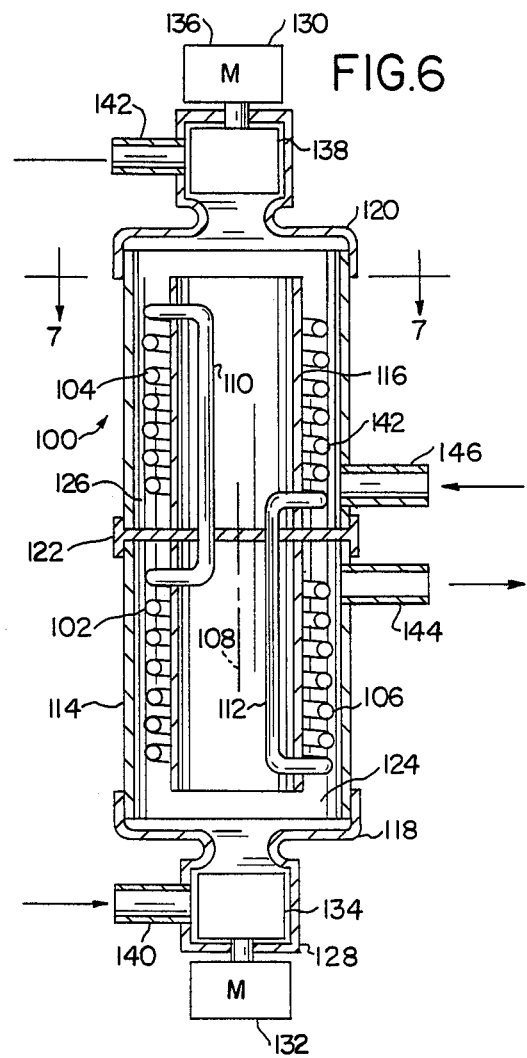
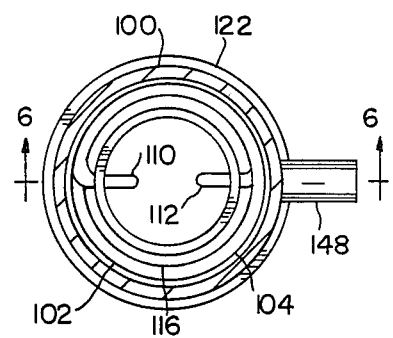

AIR TO AIR HEAT EXCHANGE STRUCTURE AND METHOD

BACKGROUND OF THE INVENTION

1. Field of the Invention

The invention relates to heat exchange structure and methods, and refers more specifically to an air to air heat exchanger for providing ventilation to dwelling areas and the method of operation of the air to air heat exchanger.

2. Description of the Prior Art

In the past, dwelling spaces such as found in houses and the like have often been adequately ventilated due to their construction allowing air to pass therethrough in non-objectionable quantities. Recently, due to the rising cost of energy, dwelling spaces have been made more airtight. The tighter construction has increased the importance of positively ventilating the dwelling spaces without losing excessive amounts of heat to the outdoors.

Further, recent information as to the harmful effects of radon in houses, as well as other toxic fumes which occur in dwelling spaces, makes it necessary to have positive ventilation, again without losing an excessive amount of energy.

In the past, ventilation has taken the form of fans, which move air around in a house. Specifically, ventilation has been provided by window fans and attic fans. In addition, most air conditioning units provide a ventilation option. Generally, the fans where they pass air into or out of a dwelling space are not energy efficient. Similarly, the expense of an air conditioning unit for ventilating purposes is prohibitive in many instances.

SUMMARY OF THE INVENTION

In accordance with the present invention, an air to air heat exchange structure and method is provided whereby ventilation is provided at the same time a very appreciable part of heat from air expelled from a dwelling space is recovered and utilized to heat incoming air.

In a preferred embodiment, the structure of the invention includes a heat exchange coil having a large diameter lower portion and a small diameter upper portion, the lower portion of which is charged with a refrigerant. An outer larger diameter cylindrical casing is provided surrounding the heat exchange coil, an inner smaller diameter cylindrical casing is provided separating the lower and upper portions of the heat exchange coil. The lower end of the outer casing is open to the inside of a dwelling space while the upper end of the outer casing is connected to the outside of the dwelling space. The upper end of the inner casing is again connected to the outside of the dwelling space while the lower end of the inner casing is connected to the inside of the dwelling space, and motor, blower structure is provided for passing warm air from inside the dwelling space upwardly through the air to air heat exchanger over the lower portion of the heat exchange coil and for drawing cool air from outside the dwelling space down through the inner casing over the upper portion of the heat exchange coil and into the dwelling space.

Alternatively, in another embodiment of the structure of the invention, the upper and lower portions of the heat exchange coil are of the same diameter and are both placed between the outer and inner cylindrical casings which are partitioned centrally to provide upper and lower chambers to receive the upper and lower portions of the heat exchange coil. Again, the top of the lower portion of the heat exchange coil is connected to the top of the upper portion of the heat exchange coil and the bottoms of the two portions of the heat exchange coil are also connected together. Motor, blower means are again provided to draw fresh, cool outside air into the upper chamber at the bottom thereof over the upper coil portion and pass the heated fresh air from the top of the upper chamber into the dwelling space and to simultaneously draw warm, stale inside air into the lower chamber at the bottom thereof, over the lower coil portion and pass the cooled, stale air out of the top of the lower chamber outside of the dwelling space.

Other embodiments and modifications of the air to air heat exchange structure of the invention are contemplated. Thus, in the alternate embodiment of the invention considered in the paragraph above, air flow through the upper and lower chambers may be reversed with the cool, fresh air entering the heat exchanger at the top of the upper chamber and the warmed fresh air being expelled at the bottom of the upper chamber. A similar air flow reversal may be provided in the lower chamber.

In all cases, however, the heat exchange coil must have upper and lower portions and preferred gravity flow from the bottom of the upper coil portion to the bottom of the lower coil portion and rising vapor feed from the top of the lower coil portion to the top of the upper coil portion.

The motor, blower means may include separate motors for each of a pair of blowers or a single motor for a plurality of blowers. The arrangement of the blower means and the associated ducts will depend on the coil and casing arrangement of the air to air heat exchanger as set forth above.

In accordance with the method of operation of the preferred embodiment of the air to air heat exchanger, the motor, blower structure is energized to force warm air from the inside of the dwelling space upwardly between the inner and outer casing of the air to air heat exchanger over the lower portion of the heat exchange coil and out of the dwelling space. The warm air from the dwelling space passing over the lower portion of the heat exchange coil causes the refrigerant therein to boil and pass to the upper portion of the heat exchange coil. The air drawn into the upper end of the inner casing by the energized motor, blower structure passes over the upper portion of the heat exchange coil and is heated thereby. Heating of the air in the inner casing condenses the boiled refrigerant in the upper portion of the heat exchange coil which is then returned to the lower portion of the heat exchange coil by gravity. The heated air from the inner casing is then passed out of the bottom of the inner casing into the dwelling space. Operation of the other embodiments of the invention is similar.

In use, the air to air heat exchange structures of the invention are positioned adjacent a window opening in the structure defining the dwelling space and the warm, stale air it is desired to remove from the dwelling space is passed out of the window opening while fresh, cool air is brought into the dwelling space through the window opening. In accordance with the invention, separate openings through the window opening are provided to permit exhaust and intake of the air as required by the air to air heat exchanger.

Motor, blower control means are also provided in accordance with the invention for controlling the amount of air drawn into and exhausted through the openings in the window opening of the dwelling space and for de-energizing the motor, blower structure when the openings through the window opening are regulated to prevent sufficient air from entering the dwelling space.

BRIEF DESCRIPTION OF THE DRAWINGS

FIG. 6 is a longitudinal section view of another embodiment of air to air heat exchange structure, constructed in accordance with the invention for practicing the method of the invention, taken substantially on the line 6—6 in FIG. 7.

FIG. 7 is a cross section of the air to air heat exchange structure illustrated in FIG. 6, taken substantially on the line 7—7 in FIG. 6.

DESCRIPTION OF THE PREFERRED EMBODIMENT

Figure 1:
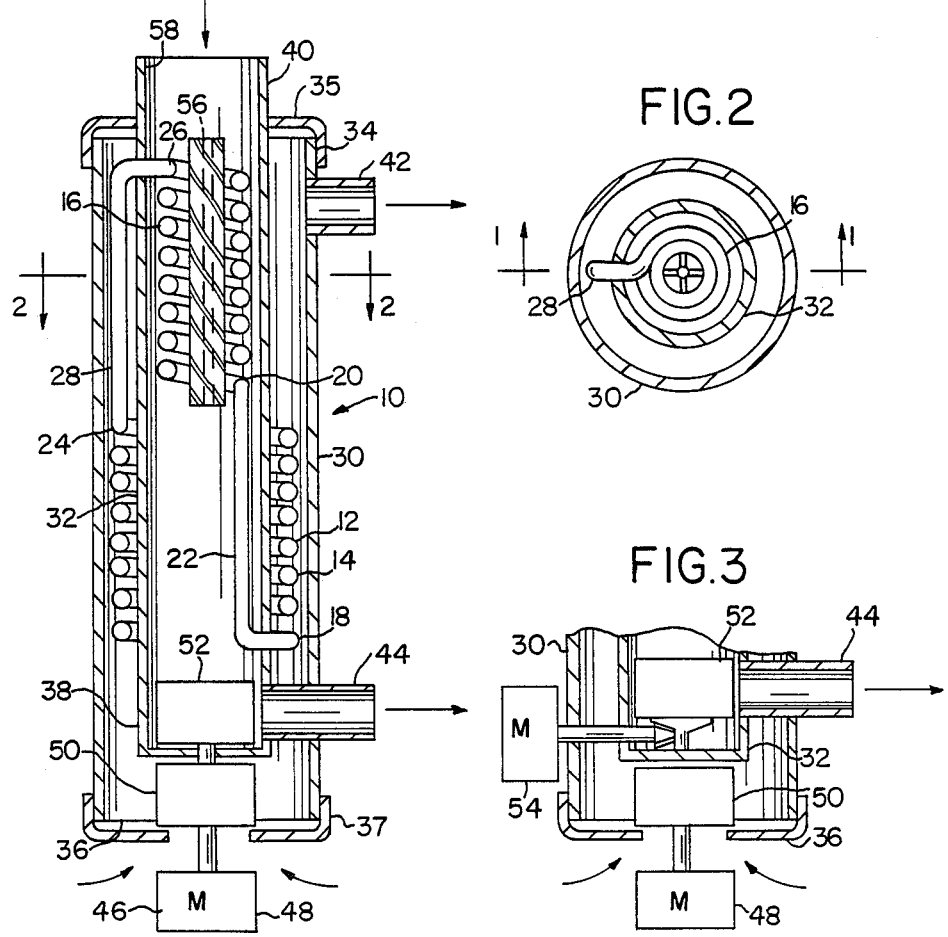
FIG. 1 is a longitudinal section view of one embodiment of air to air heat exchange structure, constructed in accordance with the invention for practicing the method of the invention, taken substantially on the line 1—1 in FIG. 2.
Figure 2:
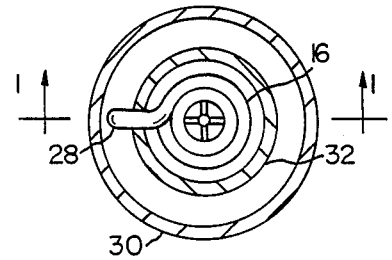
FIG. 2 is a cross section of the air to air heat exchange structure illustrated in FIG. 1, taken substantially on the line 2—2 in FIG. 1.

As shown best in FIG. 1, the air to air heat exchanger structure 10 of the invention includes a heat exchanger coil 12 having a larger diameter, lower portion 14 and a smaller diameter, upper portion 16. The bottom 18 of the bottom portion 14 of the heat exchange coil 12 is connected to the bottom 20 of the upper portion 16 of the heat exchange coil 12 by a vertical, tubular connecting portion 22. The top 24 of the bottom portion 14 of the heat exchange coil 12 is connected to the top 26 of the upper portion 16 of the heat exchange coil 12 by another tubular, vertical connecting portion 28.

The bottom portion of the heat exchange coil 12 is charged with a phase change heat transfer medium, such as any of the common refrigerants. The heat exchange coil 12 is evacuated before being charged with refrigerant.

A larger diameter, outer casing 30 surrounds the heat transfer coil 12 over its entire length. A smaller diameter, inner casing 32 surrounds the upper portion of the heat exchange coil 12 and separates the upper portion 16 and lower portion 14 of the heat exchange coil 12, as best shown in FIG. 1. The upper end 34 of the outer casing 30 is closed between the outer casing 30 and the inner casing 32 by an end cap 35. The lower end 36 of the outer casing 30 is partly closed by an end cap 37, as shown in FIG. 1.

The lower end 38 of the inner casing 32 is closed while the upper end 40 of the inner casing 32 is open.

Also, the upper end 34 of the outer casing 30 is vented radially by radially extending structure 42. The lower end 38 of the inner casing 32 is also vented radially through the outer casing 30 by the vent structure 44.

Motor, blower means 46 including a single motor 48 and two blower wheels 50 and 52 adjacent the bottom of the outer casing 30 and adjacent the bottom of the inner casing 32 are provided in the air to air heat exchanger structure 10, as shown best in FIG. 1.

Figure 3:
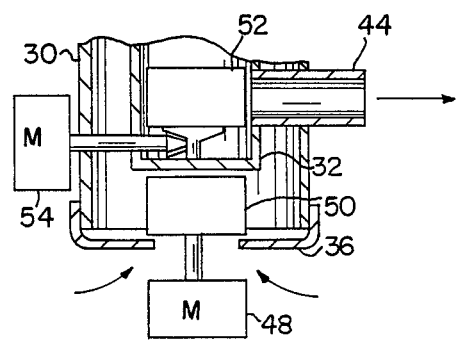
FIG. 3 is a modification of the air to air heat exchange structure illustrated in FIG. 1, showing a separate motor for each blower.

In the modification of the heat exchanger structure 10 of the invention shown in FIG. 3 wherein the similar structure is provided similar reference numerals, a separate motor 54 having a right angle drive is provided for driving the blower wheel 52. The motor 48 separately drives the blower wheel 50 in the embodiment of the invention illustrated in FIG. 3.

A baffle 56 is provided in the upper end 40 of the inner casing 32 within the upper portion 16 of the heat exchange coil 12, which is shaped to direct air drawn in the upper end 40 of the inner casing 32 over the upper portion 16 of the heat exchange coil 12.

In accordance with the method of operation of the air to air heat exchanger of the invention, the heat exchanger structure 10 is positioned in an area such as a dwelling space, which it is desired to ventilate and which has warm air therein. The open end 40 of the inner casing 32 is connected to receive cool air from outside the dwelling space, as through a window opening or the like. The duct structure 42 is connected to exhaust air outside of the dwelling space, again through window structure or the like, and the duct structure 44 is conveniently open to the inside of the dwelling space. The motor 48 of the blower means 46, when energized, rotates the blowers, or more precisely the blower wheels 50 and 52.

The blower wheel 50 withdraws warm air from the dwelling space through the cap 37 on the outer casing 30 and forces it upwardly between the outer casing 30 and the inner casing 32 past the lower portion 14 of the heat exchange coil 12 and out of the dwelling space through the duct structure 42. As the warm air from the dwelling space passes over the lower portion 14 of the heat exchange coil 12, the refrigerant in the lower portion of the heat exchange coil is caused to boil and heated refrigerant vapor passes into the upper portion 16 of the heat exchange coil 12 through the vertical connecting portion 28 to heat the upper portion 16 of the heat exchange coil 12.

The blower wheel 52 draws cool air from the outside of the dwelling space through the open end of the inner casing 32, which cool air is directed over the upper portion 16 of the heat exchange coil 12 by the baffle 56. The heated fresh air is then delivered to the dwelling space through the duct structure 44 by the blower wheel 52.

As the fresh cool air is passed over the upper portion of the heat exchange coil, the boiled refrigerant in the upper portion of the heat exchange coil is condensed and flows back to the lower portion 14 of the heat exchange coil 12 through the vertical connecting portion 22.

Figure 4:
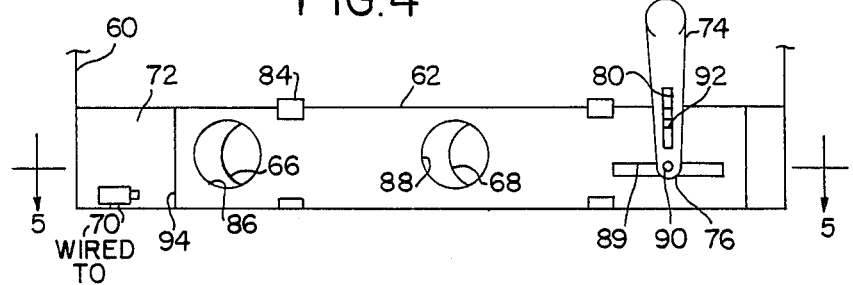
FIG. 4 is an elevation view of control structure for use in a window opening of a house with the air to air heat exchange structure of the invention to control air passed into and out of the window opening while ventilating dwelling space within the house.
Figure 5:
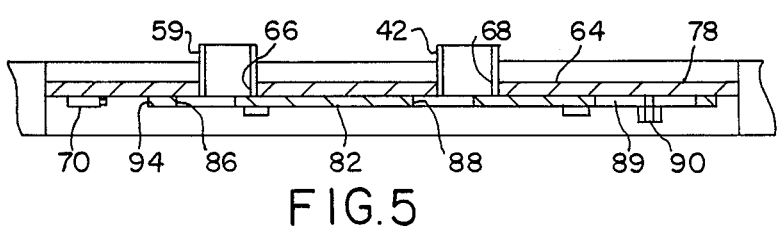
FIG. 5 is a longitudinal section view of the control structure shown in FIG. 4, taken substantially on the line 5—5 in FIG. 4.

As shown best in FIGS. 4 and 5, wherein the air to air heat exchange structure of the invention is utilized to ventilate a dwelling space, as for example a house, the heat exchange structure 10 can conveniently be positioned so that the top of the inner casing 32 can be connected by duct structure 59 to the outside of a window opening 60 through control structure 62. As shown, the control structure 62 also provides means for connecting the duct structure 42 to the outside of the dwelling space.

Thus, as shown best in FIG. 5, the control structure 62 includes an inner plate 64 positioned in, for example, the lower portion of the window opening 60, having openings 66 and 68 therein in which the duct structures 59 and 42 may be secured by convenient means, not shown. A switch 70 is secured to the end 72 of the plate 64. A lever 74 is pivotally secured at its lower end to the end 78 of the plate 64, and is provided with an elongated slot 80 therein, as shown best in FIG. 4.

A second plate 82 is slideably held in surface to surface contact with the plate 64 by tabs 84, which may, if desired, be integral with the plate 64. The second plate 82 is provided with openings 86 and 88 therein, which are of substantially the same size as the openings 66 and 68 through the plate 64. Plate 82 also has an elongated slot 89 therein to permit sliding of the plate 82 with respect to the plate 64 past the pivot pin 90 connecting the lever 74 to the plate 64. A cam pin 92 is secured to the plate 82 and extends into the longitudinally extending slot 80 in the lever 74.

The openings 66 and 86, and 68 and 88, are so positioned relative to each other that on pivoting of the lever 74 about the pivot pin 90, the outer plate 82 moves longitudinally of the inner plate 64 to open and close the openings through the plates 64 and 82 when the openings 66 and 86, and 68 and 88, are aligned. Thus, pivoting of the lever 74 counterclockwise from the position shown in FIG. 4 will ultimately prevent air from passing through the plates 64 and 82. Pivoting of the lever 74 in a clockwise direction will, in a controlled manner, permit more air flow through the plates 64 and 82.

The switch 70 provided on plate 64 is engaged with the end 94 of the plate 82 when the plate 82 is moved relative to the plate 64 by the lever 74 so as to prevent air passage through the openings therein. The switch 70 is connected to the motor means 46 so that the motor means 46 is deenergized when the switch 70 is closed. The switch 70 is closed when the plates 64 and 82 are in such relative position as to prevent desired air intake into the open end of the inner casing of the air to air heat exchange structure 10.

Thus, in accordance with the invention, there is provided structure for ventilating a dwelling space which is easy to manufacture, simple in construction and efficient in use.

While one embodiment of the present invention, together with a modification thereof, has been described in detail, other embodiments and modifications of the invention disclosed are contemplated.

Thus, for example, in the embodiment of the invention shown in FIGS. 6 and 7, the air to air heat exchanger 100, which is also constructed in accordance with the invention, includes a heat exchange coil 102 having an upper portion 104 and a lower portion 106 which are of the same diameter. As before, the heat exchange coil 102 is helical and is generated about a vertical axis 108. The top of the upper portion 104 of the heat exchange coil 102 is connected to the top of the bottom portion 106 of the heat exchange coil 102 by conduit 110 and the bottom of the upper portion 104 of the heat exchange coil 102 is connected to the bottom of the lower portion 106 of the heat exchange coil 102 by the conduit 112, all as shown in FIG. 6.

The heat exchange coil 102 is, as before, filled with a refrigerant.

The heat exchange coil 102 is surrounded exteriorly by an outer cylindrical casing 114 and in turn surrounds the interior smaller cylindrical casing 116. Lower end cap 118 and upper end cap 120 close the lower and upper ends of the outer cylindrical casing 114 respectively. A central partition 122 extends across the cylindrical casings 114 and 116 as shown. Thus, separate lower and upper chambers 124 and 126 are provided between the casings for receiving the lower and upper portions 106 and 104 of the heat exchange coil respectively.

Separate motor, blower structures 128 and 130 containing separate motor 132 and blower 134 and motor 136 and blower 138 respectively are provided at the opposite ends of the heat exchange structure 100. As shown, the lower blower is connected via conduit 140 to receive warm stale air from a dwelling space while the upper blower 138 is connected via conduit 142 to discharge heated fresh air into the dwelling space. Conduits 144 and 146 are connected to discharge cooled, stale air outside of the dwelling space and to draw cool fresh air from outside the dwelling space.

The operation of the embodiment of the heat exchange structure 100 is substantially the same as that of the heat exchange structure 10. Thus, with the blower, motor structures 128 and 130 operating, stale warm air is drawn through the blower 134 and passed over the lower portion 106 of the heat exchange coil 102 and is discharged outside of the dwelling space. Heat is given up to the lower portion 106 of the heat exchange coil 102 during such movement of the warm stale air from the dwelling space to vaporize the refrigerant in the lower portion of the heat exchange coil. The refrigerant vapor passes through the conduit 110 to the top of the upper portion of the heat exchange coil. Cool fresh air is passed over the upper portion 104 of the heat exchange coil 102 where it is heated and subsequently passed by the blower 138 into the dwelling space. Heating of the cool fresh air by the coil 102 draws heat from the refrigerant vapor, causing it to condense in the upper portion 104 of the heat exchange coil 102. The condensed refrigerant then passes back to the bottom of the lower portion of the heat exchange coil 102 through the conduit 112.

Modification of the heat exchange structure shown in FIGS. 6 and 7 is, of course, also possible. Thus, a single motor may also be used to drive both blowers through a drive shaft extending axially of the heat exchange coil 102 if desired.

It is therefore the intention to include all embodiments and modifications of the disclosed invention as are defined by the appended claims within the scope of the invention.

I claim:

1. Air to air heat exchange structure having a vertically extending axis comprising a helical coil having an axially extending lower helical coil portion and an axially extending upper helical coil portion, one of which coil portions has a diameter larger than the other of said coil portions, phase change heat exchange media in the lower coil portion, a first chamber surrounding the lower coil portion, a second chamber surrounding the upper coil portion, means separating the first chamber from the second chamber, means for passing warm air over the lower coil portion in the first chamber and means for passing cool air over the upper coil portion in the second chamber.

2. Structure as set forth in claim 1 wherein the phase change heat exchange media is a refrigerant.

3. Structure as set forth in claim 1 wherein the air to air heat exchanger is utilized to ventilate a dwelling space and wherein the means for passing air over the coil portion includes motor means and means for passing warm air from the dwelling space into one end of the first chamber past the lower portion of the coil and means for passing air out of the other end of the first chamber to the outside of the dwelling space and means for passing cool air into the second chamber at one end thereof from the outside of the dwelling space past the upper portion of the coil and out of the other end of the second chamber into the dwelling space.

4. Structure as set forth in claim 3 wherein the dwelling space is defined by a dwelling having an opening and the air to air heat exchanger is positioned adjacent the opening and further including means for passing the cool air from outside the dwelling space into the air to air heat exchanger and for passing the warm air from inside the dwelling space out of the air to air heat exchanger through the opening in the dwelling.

5. Structure as set forth in claim 4 and further including means in the opening of the dwelling space for controlling air flow into and out of the air to air heat exchanger structure through the opening.

6. Structure as set forth in claim 5 and further including switch means operably associated with the motor means and with the means for controlling air flow into and out of the air to air heat exchanger through the opening for preventing operation of the motor means when air is prevented from entering the air to air heat exchanger from outside the dwelling space in predetermined quantity.

7. Air to air heat exchange structure comprising an outer vertically extending cylindrical casing having a lower end and an upper end, an inner vertically extending cylindrical casing concentric with and positioned within the outer cylindrical casing in radially spaced relation thereto on the axis thereof having a lower closed end in spaced apart relation to the lower end of the outer casing and having an open upper end extending out of the upper end of the outer casing, a lower cover positioned over the lower end of the outer casing having a central opening therethrough through which warm air may be drawn into the chamber provided between the inner and outer casing, a cover over the upper end of the outer casing having an opening therethrough through which the upper end of the inner casing extends, a conduit for cooled warm air from between the inner and outer casing extending through the outer casing at the top thereof so as to permit exhausting of cooled warm air from between the inner and outer casing, a conduit for warmed cool air extending through the outer casing at the bottom thereof and into the inner casing so as to receive warmed cool air from inside the lower end of the inner casing, a helical coil having a vertically extending axis and including a lower helical portion positioned between the inner and outer casing and an upper helical portion positioned within the inner casing with the bottom of the two portions of the helical coil being connected with a connecting coil portion extending within the lower portion of the inner casing and through the inner casing at the lower end thereof, and the top of the upper and lower portions of the helical coil being connected with a connecting coil portion positioned between the upper portions of the inner and outer casings and extending through the inner casing adjacent the upper end thereof, a refrigerant, phase change media charge in the lower coil portion, a blower in the lower end of the inner casing for drawing cool air in the open end of the inner casing over the upper portion of the coil to warm it and passing it out of the heat exchanger through the second conduit, a blower positioned between the lower end of the inner casing and the lower end of the outer casing for drawing warm air into the heat exchanger through the opening in the bottom cover thereof and passing it over the lower portion of the coil and exhausting it from the heat exchange structure through the first conduit and motor means operably associated with the blowers for driving the blowers.

8. Structure as set forth in claim 7 and further including a baffle positioned in the inner casing at the upper end thereof for circulating air drawn into the upper end of the inner casing over the upper portion of the coil.

9. Air to air heat exchange structure having a vertically extending axis comprising a helical coil having an axially extending lower coil portion and an axially extending upper helical coil portion, the lower coil portion of which has a larger diameter than the upper coil portion, phase change heat exchange media in the lower coil portion, a first chamber surrounding the lower coil portion, a second chamber surrounding the upper coil portion, means separating the first chamber from the second chamber, means for passing warm air over the lower coil portion in the first chamber, and means for passing cool air over the upper coil portion in the second chamber.

10. Structure as set forth in claim 9 wherein the chambers are formed by two axially concentric cylindrical casings, the first of which casings has a diameter larger than the second casing, the upper coil portion is positioned within the smaller diameter casing and the lower coil portion is positioned between the smaller diameter casing and the larger diameter casing, and the tops of the coil portions and the bottoms of the coil portions are connected together.

11. Structure as set forth in claim 9 wherein the means for passing air over the coil portions comprises motor means and separate blower means operably associated with each chamber.

12. Structure as set forth in claim 11 wherein the motor means is a single motor operably associated with the blower means to drive both blower means.

13. Structure as set forth in claim 11 wherein the motor means includes a separate motor for driving each blower means.

14. Structure as set forth in claim 9 and further including baffle means within the second chamber adjacent the upper coil portion for circulating air passing through the second chamber over the upper coil portion.

15. Air to air heat exchange structure having a vertically extending axis comprising a helical coil having an axially extending lower helical coil portion and an axially extending upper helical coil portion, phase change heat exchange media in the lower coil portion, a first chamber surrounding the lower coil portion, a second chamber surrounding the upper coil portion, means separating the first chamber from the second chamber, means for passing warm air over the lower coil portion, means for passing cool air over the upper coil portion in the second chamber, and baffle means within the second chamber adjacent the upper coil portion for circulating air passing through the second chamber over the upper coil portion.

16. Structure as set forth in claim 15 wherein the lower coil portion has a larger diameter than the upper coil portion.

17. Structure as set forth in claim 15 wherein the lower coil portion has the same diameter as the upper coil portion.

18. Structure as set forth in claim 15 wherein the chamber are formed by two axially concentric cylindrical casings, the first of which casings has a diameter larger than the second casing and which casings are separated into upper and lower parts forming upper and lower chambers by a centrally located transversely extending partition, the upper coil portion is positioned between the casings in the upper chamber and the lower coil portion is positioned between the casings in the lower chamber and the tops of the coil portions and the bottoms of the coil portions are connected together.

19. Structure as set forth in claim 16 wherein the chambers are formed by two axially concentric cylindrical casings, the first of which casings has a diameter larger than the second casing, the upper coil portion is positioned within the smaller diameter casing, and the lower coil portion is positioned between the smaller diameter casing and the larger diameter casing, and the tops of the coil portions and the bottoms of the coil portions are connected together.

20. Structure as set forth in claim 15 wherein the phase change heat exchange media is a refrigerant.

21. Structure as set forth in claim 15 wherein the means for passing air over the coil portion comprises motor means and separate blower means operably associated with each chamber.

22. Structure as set forth in claim 21 wherein the motor means is a single motor operably associated with the blower means to drive both blower means.

23. Structure as set forth in claim 21 wherein the motor means includes a separate motor for driving each blower means.

24. Structure as set forth in claim 15 wherein the air to air heat exchanger is utilized to ventilate a dwelling space and further including means for passing warm air from the dwelling space to one end of the first chamber past the lower portion of the coil and means for passing air out of the other end of the first chamber to the outside of the dwelling space, and means for passing cool air into the second chamber at one end thereof from the outside of the dwelling space past the upper portion of the coil and out of the other end of the second chamber into the dwelling space.

25. Structure as set forth in claim 24 wherein the dwelling space is defined by a dwelling having an opening and an air to air heat exchanger is positioned adjacent the opening, and further including means for passing cool air from outside the dwelling space into the air to air heat exchanger and for passing the warm air from inside the dwelling space out of the air to air heat exchanger through the opening in the dwelling.

26. Structure as set forth in claim 25 and further including means in the opening of the dwelling space for controlling the air flow into and out of the air to air heat exchanger structure through the opening.

27. Structure as set forth in claim 26 and further including switch means operably associated with the motor means and with the means for controlling air flow into and out of the air to air heat exchanger through the opening for preventing operation of the motor means when air is prevented from entering the air to air heat exchanger from outside the dwelling space in predetermined quantities.

28. Air to air heat exchange structure having a vertically extending axis comprising a helical coil having an axially extending lower helical coil portion and an axially extending upper helical coil portion, phase change heat exchange media in the lower coil portion, a first chamber surround the lower coil portion, a second chamber surrounding the upper coil portion, means separating the first chamber from the second chamber, means including motor means, for passing warm air over the lower coil portion in the first chamber and means for passing cool air over the upper coil portion in the second chamber, which air to air heat exchange structure is utilized to ventilate a dwelling space defined as a dwelling having an opening and wherein the air to air heat exchanger is positioned adjacent the opening and wherein the heat exchange structure further including means for passing warm air from the dwelling space and into one end of the first chamber past the lower portion of the coil and means for passing air out of the other end of the first chamber to the outside of the dwelling space, and means for passing cool air into the second chamber at one end thereof from the outside of the dwelling space past the upper portion of the coil and out of the other end of the second chamber into the dwelling space and further including means in the opening of the dwelling space for controlling air flow into and out of the air to air heat exchanger through the opening and switch means operably associated with the motor means and with the means for controlling the air flow into and out of the air to air heat exchanger through the opening for preventing operation of the motor means when air is prevented from entering the air to air heat exchanger from outside the dwelling space in predetermined quantity.

29. The method as set forth in claim 28 and further including positioning the heat exchange coil adjacent a building opening, passing warm air from inside the building past the lower portion of the heat exchange coil and out of the building opening and drawing cool air through the building opening past the upper portion of the heat exchange coil and into the building and controlling the air passed into and out of the building opening.

30. The method as set forth in claim 29 and further including forcing the air past the heat exchange coil.

31. An air to air heat exchange method comprising constructing a helical heat exchange coil with a vertically extending axis having an upper axially extending helical portion and a lower axially extending helical portion, charging the lower portion of the helical coil with a phase change heat exchange medium, passing warm air over the lower portion of the heat exchange coil to boil the refrigerant therein and passing cool air to be heated over the upper portion of the heat exchange coil to heat the cool air and specifically directing air over the upper portion of the heat exchange coil with a baffle means.

32. An air to air heat exchange method comprising constructing a helical heat exchange coil with a vertically extending axis having an upper axially extending helical portion and a lower axially extending helical portion, charging the lower portion of the heat exchange coil with a phase change heat exchange medium, passing warm air over the lower portion of the heat exchange coil to boil the refrigerant therein and passing cool air to be heated over the upper portion of the heat exchange coil to heat the cool air, positioning the heat exchange coil adjacent a building opening, passing warm air from inside the building past the lower portion of the heat exchange coil and out of the building opening, drawing cool air through the building opening past the upper portion of the heat exchange coil and into the building, and controlling the air passed into and out of the building opening and further including forcing the air past the heat exchange coil only when a predetermined amount of cool air is drawn into the building opening.

33. Air to air heat exchange structure comprising two axially concentric cylinder casings, the first of which casings has a diameter larger than the second casing, the second of which casings is positioned within the first casing for at least a portion of its length, means operably associated with the concentric cylindrical casings for forming two separate chambers therewith, a helical coil coaxial with the concentric cylindrical casings having an axially extending lower helical coil portion in one of the chambers and an axially extending upper helical coil portion in the other of the chambers, phase change heat exchange media in the helical coil, means for passing warm air over the lower coil portion and out of the heat exchanger, and means for passing cool air over the upper coil portion and out of the heat exchanger.

34. Structure as set forth in claim 33 wherein the means for forming two separate chambers with the concentric cylindrical casings includes a closed lower end on the inner concentric cylindrical casing within the outer concentric cylindrical casing, an end cap over the lower end of the outer concentric cylindrical casing and an end cap over the upper en of the outer concentric cylindrical casing through which the other end of the inner concentric cylindrical casing extends and wherein the lower coil portion is positioned between the inner and outer concentric cylindrical casings and the upper coil portion is positioned within the inner concentric cylindrical casing.

35. Structure as set forth in claim 34 wherein the means for passing air over the coil portions includes a blower in the lower end of each of the concentric cylindrical casings, one in each of said casings, and motor means for driving each of the blowers.

36. Structure as set forth in claim 35 wherein the motor means comprises a separate motor for driving each of the separate blowers.

37. Structure as set forth in claim 35 wherein the motor means comprises a single motor for driving both blowers.

38. Structure as set forth in claim 33 wherein the means operably associated with the concentric cylindrical casings for forming two separate chambers therewith comprises a transversely extending partition positioned substantially centrally of the ends of the concentric cylindrical casings.

39. Structure as set forth in claim 38 wherein the means for passing air over the coil portions comprises separate blowers at each end of the concentric cylinders and separate motors for driving the separate blowers.

40. Structure as set forth in claim 33 and further including baffle means within at least one of the chambers adjacent the coil portion therein for circulating air passing through the chamber over the coil portion.

* * * * *